United States Patent [19]

Gellert

[11] 4,406,609
[45] Sep. 27, 1983

[54] VALVE PIN AND METHOD OF MANUFACTURE

[76] Inventor: Jobst U. Gellert, 7A Prince St., Glen Williams, Canada

[21] Appl. No.: 285,274

[22] Filed: Jul. 20, 1981

[30] Foreign Application Priority Data

Jul. 15, 1981 [CA] Canada ................................... 381790

[51] Int. Cl.³ ............................................. B29F 1/03
[52] U.S. Cl. .................................... 425/566; 425/548
[58] Field of Search .............................. 425/564–566, 425/548

[56] References Cited

U.S. PATENT DOCUMENTS 4,125,352 11/1978 Gellert .............................. 425/566
4,276,015  6/1981 Rogers ........................... 425/566 X

*Primary Examiner*—Thomas P. Pavelko
*Attorney, Agent, or Firm*—Riches, McKenzie & Herbert

[57] ABSTRACT

This invention relates to an improved valve pin for an injection molding system and a method of making the same. The elongated valve pin has a tip end portion which extends from a larger driven end portion into the flow of melt to the cavity. The elongated tip end portion is provided with a desired combination of strength and thermal conductivity by having a copper core inside a steel casing. The casing is made by brazing a tip end cap member to a hollow sleeve. A predetermined quantity of copper wire is then inserted into the casing and melted in a vacuum furnace to form an integral construction. The excess sleeve is then cut off and the end is brazed into a well in the driven end portion of the valve pin. The tip end cap member is then machined to provide a tip end of a desired shape. Filling the copper into the steel casing in a vacuum furnace bonds them together without any insulative spaces, thereby relatively inexpensively providing a valve pin structure which has the necessary structural strength to withstand repeated closing forces, while at the same time providing for the improved transfer of heat along the valve pin to the gate area.

3 Claims, 6 Drawing Figures

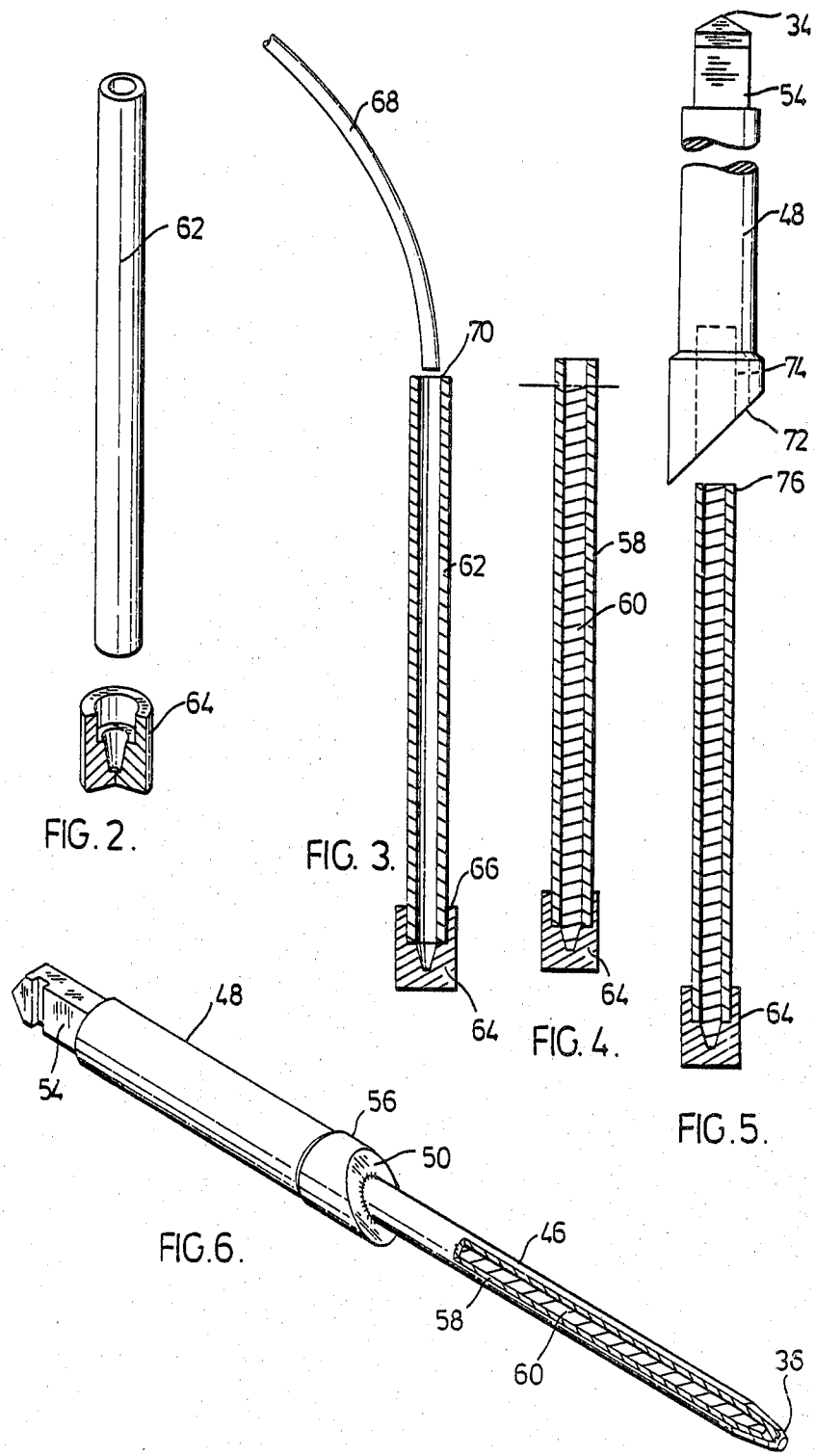

VALVE PIN AND METHOD OF MANUFACTURE

BACKGROUND OF THE INVENTION

This invention relates to a valve gated injection molding system and more particularly to an improved valve pin therefor and method of making the same.

Valve gated injection molding systems of this general type are well known, as shown in the applicant's previous U.S. Pat. No. 4,013,393 entitled "Valve Gated Injection Molding Mechanism" which issued Mar. 22, 1977. It is also known that the structural characteristics of these systems which control temperature in the area of the gate are vital to the reliable operation of the system, although the critical importance of this has been recognized more recently. The hot heater cast is separated from the surrounding cooled cavity plate, but adjacent the gate the cavity plate is relatively thin so that sufficient heat must be provided to enable the valve pin to seat properly, without unduly heating the adjacent cavity plate. While heat has been provided to the gate area by the heater cast and by the melt itself, it has been found advantageous to provide additional heat by conduction through the valve pin itself. However, this solution to the heat transfer problem is impeded by the fact that the valve pin must have sufficient structural strength to withstand the very considerable repeated closing forces applied to it which may be as high as several hundred pounds. As disclosed in above mentioned U.S. Pat. No. 4,013,393, an early attempt to overcome this problem was to form part of the valve pin of a beryllium copper alloy.

While this provided more heat than the previous all steel valve pins, it was still not sufficient for some applications and a further solution to the problem is shown in the applicant's U.S. Pat. No. 4,125,352 entitled "Thermal Valve Pin" which issued Nov. 14, 1978. This patent discloses a valve pin of which a portion is formed by a "heat pipe". While this structure provides adequate heat transfer, it has the disadvantage of being expensive to manufacture and the operational difficulty that it must be properly oriented to function satisfactorily. In addition, there are difficulties in manufacturing these "heat pipe" valve pins of an appropriate material so that they have uniform heat transfer characteristics from one to the next.

SUMMARY OF THE INVENTION

Accordingly, it is an object of the present invention to at least partially overcome these disadvantages by providing a valve pin structure having a critical combination of structural strength and heat transfer characteristics and a relatively inexpensive method of manufacturing the same.

To this end, in one of its aspects, the invention provides a method of manufacturing an elongated integral injection molding valve pin having a driven end and a tip end with an elongated tip end portion extending from an elongated driven end portion to the tip end, the tip end portion being formed of a high strength outer casing portion over a highly conductive inner core portion, comprising the steps of forming an elongated hollow casing portion with a closed tip end and an open mouth, inserting a predetermined quantity of highly conductive material into the hollow casing member through the upwardly open mouth, heating the casing member in a vacuum furnace until the highly conductive material melts and then allowing it to cool until the conductive material solidifies to form an integral tip end portion, and collinearly fixedly securing the tip end portion to the driven end portion.

In another of its aspects, the invention provides an injection molding valve gated flow control mechanism wherein a hot runner passage for conveying plastic melt extends from a molding machine to a gate leading to a cavity in a mold, an elongated valve pin having a driven end and a tip end is actuated to reciprocate between an open position and a closed position in which the tip end of the valve pin is seated in the gate, and at least a portion of the valve pin near the tip end is disposed in the hot runner passage, the improvement wherein at least the portion of the valve pin near the tip end has a combination of a high strength and durable outer casing portion over a highly conductive inner core portion, whereby the combination provides sufficient strength and durability to withstand operating forces and is sufficiently conductive to provide adequate heat for proper closing of the valve gate through substantially frozen melt.

Further objects and advantages of the invention will appear from the following description taken together with the accompanying drawings.

BRIEF DESCRIPTION OF THE INVENTION

FIG. 1 is a partial isometric view of a valve gated injection molding system with a valve pin according to a preferred embodiment of the invention; and FIGS. 2-6 illustrate the sequence of manufacture of the valve pin seen in FIG. 1 according to a preferred embodiment.

DESCRIPTION OF THE PREFERRED EMBODIMENTS

Figure 1:
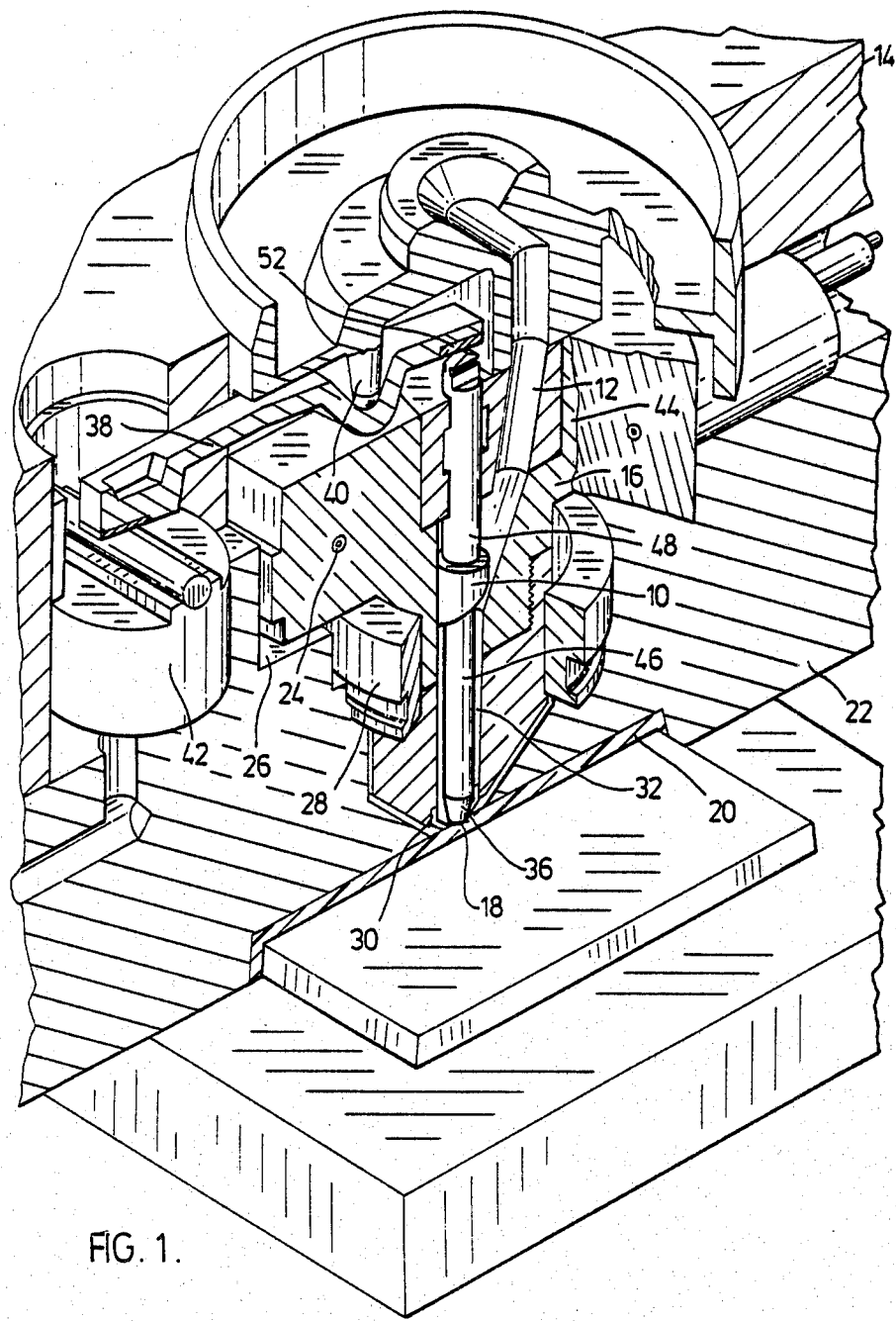

Reference is first made to FIG. 1 which shows a portion of a valve gated injection molding system with a valve pin 10 according to a preferred embodiment of the invention. In this system, a hot runner passage 12 extends from a molding machine (not shown), through a back plate 14 and a heater cast 16 to a gate 18 leading to a cavity 20 in a cavity plate 22. The heater cast 16 is heated by an electrical heating element 24 and is separated from the cooled cavity plate 22 in which it is seated by air space 26 to reduce heat transfer therebetween. The air space 26 is bridged by an insulation bushing 28 which supports the heater cast 16 and retains it in position and by a nozzle seal 30 which extends around the gate 18 and is made of a titanium alloy which has a relatively low thermal conductivity to avoid excessive heat loss to the cavity plate 22.

The valve pin 10 is located in a central bore 32 in the heater cast 16 and has a peaked driven end 34 and a tip end 36 which is shaped to be seated in the nozzle seal 30 and gate 18. The peaked driven end 34 receives one end of a rocker arm 38 which pivots on a pivot pin 40 projecting from the back plate 14 and is driven by an air operated piston 42. As may be seen, the central bore 32 through which the valve pin 10 extends and the hot runner passage 12 are separate where they extend through a bushing seal 44 which is seated in the heater cast 16 and abuts against back plate 14. However, the hot runner passage 12 joins the central bore 32 and the melt flows around a tip end portion 46 of the valve pin 10 before reaching the gate 18. The tip end portion 46 of the valve pin 10 joins a larger diameter driven end portion 48 at a shoulder 50 which is sloped to provide for smooth flow of the melt coming in from the side when the valve pin is in the open position.

The structure of the valve pin 10 may clearly be seen in FIG. 6. The driven end 34 is peaked to provide line contact with the rocker arm 38, which has a carbide pad 52 to reduce wear. The driven end portion 48 is normally larger in diameter than the tip end portion 46 and has flattened sides 54 adjacent the driven end 34. The driven end portion 48 has an enlarged portion 56 which abuts against the bushing seal 44 in the open position. The tip end portion 46 has a unique structure which provides it with a desired combination of structural strength, durability and thermal conductivity. The tip end portion 46 has an outer casing portion 58 which covers an inner core portion 60. The outer casing portion 58 is formed of a material such as H13 steel which has high structural strength and durability, while the inner core portion 60 is formed of a material such as copper which has a high thermal conductivity. In the embodiment, the ratio of the cross-sectional area of the copper to the cross-sectional area of the steel is approximately 3:1, but this ratio will vary depending upon the combination of strength and conductivity characteristics required for a particular molding application. For any particular application, the valve pin 10 must have sufficient structural strength to reliably withstand the closing force applied to it by the rocker arm 38, but the amount of force required to close the gate is, in turn, dependent upon the amount of heat it conducts to the gate area to facilitate the tip end 36 "burning" its way in to seat in the gate 18.

In use, the heating element 24 is connected to a power source to heat the heater cast 16 to operating temperature, the cavity plate 22 is cooled by equivalent cooling means (not shown), and molding commences. With the piston 42, rocker arm 38 and valve pin in an open position, heated pressurized plastic melt is injected from a molding machine into the hot runner passage 12. The melt flows through the hot runner passage 12, around the tip end portion 46 of the valve pin 10, through the gate 18 and into the cavity 20. Following a short packing period, piston 42 is pneumatically actuated to pivot the rocker arm 38 to drive the valve pin 10 to the closed position shown in FIG. 1. In this position, the tip end 36 is seated in the nozzle seal 30 and gate 18. The injection screw-ram recharges under low pressure and, following a short cooling period, the mold is opened to eject the molding product from the cavity 20. The mold is then closed again and high melt injection pressure is again applied by the molding machine as the pneumatic pressure on the piston 42 is released. This causes the valve pin to be driven to the open position and the cycle is complete. This operating cycle is repetitive and is automatically controlled by means (not shown) which apply the pneumatic pressure and open and close the mold. The quality of the molded product as well as trouble free continuous operation is dependent upon the degree of heat provided in the area of the gate throughout the cycle. There must be sufficient heat to permit the valve pin 10 to close without the use of excessive force, while at the same time providing for adequate cooling of the melt in the cavity 20. The copper inner core portion 60 of the tip end portion 46 of the valve pin 10 conducts heat from the melt further upstream and the adjacent heater cast 16 down right into the gate area. Furthermore, as mentioned above, up to a point, the more copper that is provided to carry heat to the gate area, the less steel is required because less force is necessary to drive the valve pin to the closed position.

FIGS. 2-6 illustrate a method of manufacturing this valve pin according to a preferred embodiment of the invention. First, an elongated hollow steel sleeve 62 is inserted into a steel tip end cap member 64 which has been machined to fit. Then, they are brazed together by applying a nickel brazing paste to the joint 66 between them and heating in a vacuum furnace to a sufficient temperature to braze them. After they are removed from the furnace, a predetermined quantity of copper in the form of a wire 68 is inserted into the sleeve 62 through the open mouth 70. The assembly is then again heated in a vacuum furnace to melt the copper. While the temperature and time in the furnace must be sufficient to melt the copper and allow it to flow all around the inside of the assembly, it must not be sufficient to weaken the previously brazed joint 66. As is known, filling under a partial vacuum allows the copper to flow more freely and form an improved bond with the surrounding steel. In addition to providing for the maximum amount of copper in the space available, this has the advantage of eliminating insulative air bubbles which might otherwise be formed between the copper and the steel. It will be appreciated that the brazing and filling steps are normally carried out in batches and the filling step in particular must be done with the assemblies oriented in an upright position to prevent the copper running out the mouths when it is melted. After filling, an upper portion of the sleeve 62 will still be hollow and this is cut off to provide the tip end portion 46 which is completely filled and of a predetermined length.

The driven end portion 48 is machined to have the shape illustrated with a peaked driven end 34, flattened sides 54, enlarged portion 56 and a sloping face 72. A well 74 is drilled centrally in the sloping face 72 to receive the end 76 of the tip end portion 46 which is then induction brazed in place. This securely fixes the tip end portion 46 in axial alignment with the driven end portion 48 to provide an integral unit. The tip end cap member 64 is then machined to provide a valve pin 10 with a tip end of a predetermined shape.

Although the description of the valve pin and method of making it have been provided according to preferred embodiments, it is not to be construed in a limiting sense. Variations and modifications will now occur to those skilled in the art. In particular, while the hollow outer casing portion 58 has been described and illustrated as having been formed by securing a cap member 64 to a hollow sleeve 62, it will be apparent that it may also be formed by drilling a blind hole in a suitable elongated solid member. Furthermore, while the casing portion 58 must be formed of a high strength material and the inner core portion 60 must be highly conductive, the invention is not limited to the particular combination given. Similarly, as mentioned above, the ratio of the amount of highly conductive material to high strength material will vary depending upon a number of factors. Reference is made to the appended claims for a definition of the invention.

What I claim is:

1. In an injection molding valve gated flow control mechanism wherein a hot runner passage for conveying plastic melt extends from a molding machine to a gate leading to a cavity in a mold, an elongated valve pin having a driven end and a tip end is actuated to reciprocate between an open position and a closed position in which the tip end of the valve pin is seated in the gate, and a portion of the valve pin near the tip end extends from an enlarged driven end portion into the hot runner passage, the improvement wherein at least the portion of the valve pin near the tip end has a combination of a high strength and durable steel outer casing portion over a highly conductive copper inner core portion, whereby the combination provides sufficient strength and durability to withstand operating forces and is sufficiently conductive to provide adequate heat for proper closing of the valve gate through substantially frozen melt.

2. An improvement as claimed in claim 1 wherein the driven end of the valve pin is peaked.

3. An improvement as claimed in claim 1 wherein the tip end has a frusto-conical shape.

* * * * *